United States Patent
Hatano et al.

(10) Patent No.: US 12,529,528 B2
(45) Date of Patent: Jan. 20, 2026

(54) HEAT ABSORPTION AND RADIATION SYSTEM

(71) Applicants: AISIN CORPORATION, Aichi (JP); THE UNIVERSITY OF TOKYO, Tokyo (JP)

(72) Inventors: Ryu Hatano, Kariya (JP); Kazuhiko Motodohi, Kariya (JP); Kazuo Isogai, Kariya (JP); Takashi Momiki, Kariya (JP); Shin-Ichi Ohkoshi, Tokyo (JP)

(73) Assignees: AISIN CORPORATION, Kariya (JP); THE UNIVERSITY OF TOKYO, Tokyo (JP)

( * ) Notice: Subject to any disclaimer, the term of this patent is extended or adjusted under 35 U.S.C. 154(b) by 128 days.

(21) Appl. No.: 18/565,291

(22) PCT Filed: Mar. 18, 2022

(86) PCT No.: PCT/JP2022/012768
§ 371 (c)(1),
(2) Date: Nov. 29, 2023

(87) PCT Pub. No.: WO2023/002698
PCT Pub. Date: Jan. 26, 2023

(65) Prior Publication Data
US 2024/0271880 A1    Aug. 15, 2024

(30) Foreign Application Priority Data
Jul. 20, 2021    (JP) .................................. 2021-120065

(51) Int. Cl.
*F28D 20/00* (2006.01)
*C09K 5/10* (2006.01)
*F28D 20/02* (2006.01)

(52) U.S. Cl.
CPC .............. *F28D 20/025* (2013.01); *C09K 5/10* (2013.01); *F28D 20/028* (2013.01)

(58) Field of Classification Search
CPC ...................................................... C09K 7/10
See application file for complete search history.

(56) References Cited

U.S. PATENT DOCUMENTS 6,447,692 B1 * 9/2002 Momoda .................. C09K 5/10
                                                        252/75
2016/0237331 A1   8/2016 Ohkoshi et al.
(Continued)

FOREIGN PATENT DOCUMENTS

JP    2020-200799 A    12/2020
JP    2021-031584 A    3/2021
(Continued)

OTHER PUBLICATIONS

K. Boukheddaden et al. "Experimental Access to Elastic and Thermodynamic Properties of RbMnFe(CN)6". Journal of Applied Physics, 2011, vol. 109, pp. 013520.
(Continued)

*Primary Examiner* — Eric S Ruppert
(74) *Attorney, Agent, or Firm* — Oliff PLC

(57) ABSTRACT

A heat absorption and radiation system uses a heat medium containing a rubidium-manganese-iron cyano complex, and is configured to release heat from the heat medium by applying a pressure to the heat medium and causing phase transition of the rubidium-manganese-iron cyano complex from a high-temperature phase to a low-temperature phase, absorb heat into the heat medium by releasing the pressure applied to the heat medium and causing phase transition of the rubidium-manganese-iron cyano complex from the low-temperature phase to the high-temperature phase, and repeat application of the pressure to and release of the pressure from the heat medium. Thus, it is possible to efficiently (Continued)

absorb and release heat through effective utilization of the characteristics of the rubidium-manganese-iron cyano complex.

4 Claims, 12 Drawing Sheets

(56) References Cited

U.S. PATENT DOCUMENTS

2019/0048243 A1   2/2019  Ohkoshi et al.
2022/0186991 A1   6/2022  Yoshimoto et al.

FOREIGN PATENT DOCUMENTS

| JP | 2021-085618 A | 6/2021 |
| JP | 2021-089095 A | 6/2021 |
| WO | 2015/050269 A1 | 4/2015 |
| WO | 2021/059985 A1 | 4/2021 |

OTHER PUBLICATIONS

May 17, 2022 International Search Report issued in International Patent Application No. PCT/JP2022/012768.
Tokoro et al., "Photo-Induced Charge-Transfer Phase Transition of Rubidium Manganese Hexacyanoferrate in Ferromagnetic and Paramagnetic States," Journal of Magnetism and Magnetic Materials, 2007, vol. 310, pp. 1422-1428.
Sep. 10, 2024 Extended Search Report issued in European Patent Application No. 22845638.0.

* cited by examiner

PRESSURIZATION

DEPRESSURIZATION

HEAT ABSORPTION AND RADIATION SYSTEM

TECHNICAL FIELD

The present disclosure relates to a heat absorption and radiation system using a heat medium containing a rubidium-manganese-iron cyano complex.

BACKGROUND ART

Hitherto, a rubidium-manganese-iron cyano complex ($Rb_xMn[Fe(CN)_6]_y$) has been known as a phase transition material having bistability (see, for example, Non-patent Document 1). Such a rubidium-manganese-iron cyano complex exhibits the bistability in two states that are a high-temperature phase in which the valences of manganese and iron are Mn(II)-Fe(III) and a low-temperature phase in which the valences of manganese and iron are Mn(III)-Fe(II). When the rubidium-manganese-iron cyano complex is heated to a first temperature or higher, phase transition occurs from the low-temperature phase to the high-temperature phase to absorb heat. When the temperature is equal to or lower than a second temperature that is lower than the first temperature, phase transition occurs from the high-temperature phase to the low-temperature phase to release heat. Non-patent Document 1 further discloses that, when the rubidium-manganese-iron cyano complex is pressurized, the phase transition temperature from the high-temperature phase to the low-temperature phase and the phase transition temperature from the low-temperature phase to the high-temperature phase increase.

Hitherto, there is known a heat storage and radiation system using a heat storage body containing the rubidium-manganese-iron cyano complex (see, for example, Patent Document 1). This heat storage and radiation system includes a heat insulating case that houses the heat storage body, an opening and closing device that opens and closes the opening of the heat insulating case, a first heat transfer portion that connects a heat generating body and the heat storage body in a heat conductive manner and can be switched between a heat transfer state and a non-heat transfer state, a second heat transfer portion that connects a heating target and the heat storage body in a heat conductive manner and can be switched between a heat transfer state and a non-heat transfer state, and a control unit. The control unit closes the opening and brings the first heat transfer portion into the heat transfer state when the temperature of the heat generating body is equal to or higher than the first temperature. The control unit opens the opening and brings the second heat transfer portion into the heat transfer state when the outside air temperature around the heat insulating case is equal to or lower than the second temperature and a prescribed starting condition related to the heating target is satisfied. Thus, when the temperature of the heat generating body is equal to or higher than the first temperature, heat of the heat generating body is transferred to the heat storage body, and the heat storage body (rubidium-manganese-iron cyano complex) undergoes phase transition to the high-temperature phase to store heat. When the outside air temperature is equal to or lower than the second temperature and the starting condition is satisfied, the heat storage body is cooled to the second temperature or lower with outside air flowing into the heat insulating case through the opening, and the heat storage body (rubidium-manganese-iron cyano complex) undergoes phase transition to the low-temperature phase to radiate heat. Thus, the heating target can be heated by the heat released from the heat storage body.

RELATED ART DOCUMENTS

Non-Patent Documents

Non-patent Document 1: JOURNAL OF APPLIED PHYSICS 109, 013520 (2011)
Patent Document 1: Japanese Unexamined Patent Application Publication No. 2020-200799 (JP 2020-200799 A)

SUMMARY OF THE DISCLOSURE

Problem to be Solved by the Disclosure

According to the heat storage and radiation system described in Patent Document 2, with a relatively simple configuration, heat can efficiently be absorbed from the heat generating body and stored in the heat storage body, and the stored heat can be radiated from the heat storage body as necessary to heat the heating target. In the above heat storage and radiation system, however, the rubidium-manganese-iron cyano complex is used only to store heat absorbed from the heat generating body and radiate the stored heat to heat the heating target. The characteristics of the rubidium-manganese-iron cyano complex disclosed in Non-patent Document 1 are not fully utilized.

In view of the above, a main object of the present disclosure is to provide a heat absorption and radiation system that can efficiently absorb and release heat by effectively utilizing the characteristics of the rubidium-manganese-iron cyano complex.

Means for Solving the Problem

A heat absorption and radiation system of the present disclosure is a heat absorption and radiation system using a heat medium containing a rubidium-manganese-iron cyano complex. The heat absorption and radiation system is configured to release heat from the heat medium by applying a pressure to the heat medium and causing phase transition of the rubidium-manganese-iron cyano complex from a high-temperature phase to a low-temperature phase, absorb heat into the heat medium by releasing the pressure applied to the heat medium and causing phase transition of the rubidium-manganese-iron cyano complex from the low-temperature phase to the high-temperature phase, and repeat application of the pressure to and release of the pressure from the heat medium.

The heat absorption and radiation system of the present disclosure releases heat from the heat medium containing the rubidium-manganese-iron cyano complex by applying the pressure to the heat medium and causing the phase transition of the rubidium-manganese-iron cyano complex from the high-temperature phase to the low-temperature phase. That is, when the pressure is applied to the rubidium-manganese-iron cyano complex, the phase transition temperature from the high-temperature phase to the low-temperature phase and the phase transition temperature from the low-temperature phase to the high-temperature phase increase. By applying the pressure to the heat medium, the phase transition temperature from the high-temperature phase to the low-temperature phase that is lower than the phase transition temperature from the low-temperature phase to the high-temperature phase increases. Therefore, the heat medium can release heat by the phase transition of the rubidium-manganese-iron cyano complex from the high-temperature phase to the low-temperature phase without greatly reducing the temperature of the heat medium. The inventors found that, when the pressure applied to the rubidium-manganese-iron cyano complex is released, the phase transition temperature from the high-temperature phase to the low-temperature phase and the phase transition temperature from the low-temperature phase to the high-temperature phase decrease. By releasing the pressure applied to the heat medium, the rubidium-manganese-iron cyano complex can undergo the phase transition from the low-temperature phase to the high-temperature phase without greatly increasing the temperature of the heat medium. By repeating the application of the pressure to and the release of the pressure from the heat medium, heat can be transferred from the low-temperature portion to the high-temperature portion via the heat medium. As a result, it is possible to realize the heat absorption and radiation system that functions as a heat pump by efficiently absorbing and releasing heat through effective utilization of the characteristics of the rubidium-manganese-iron cyano complex.

MODES FOR CARRYING OUT THE DISCLOSURE

Now, a mode for carrying out the present disclosure will be described with reference to the drawings.

Figure 1:
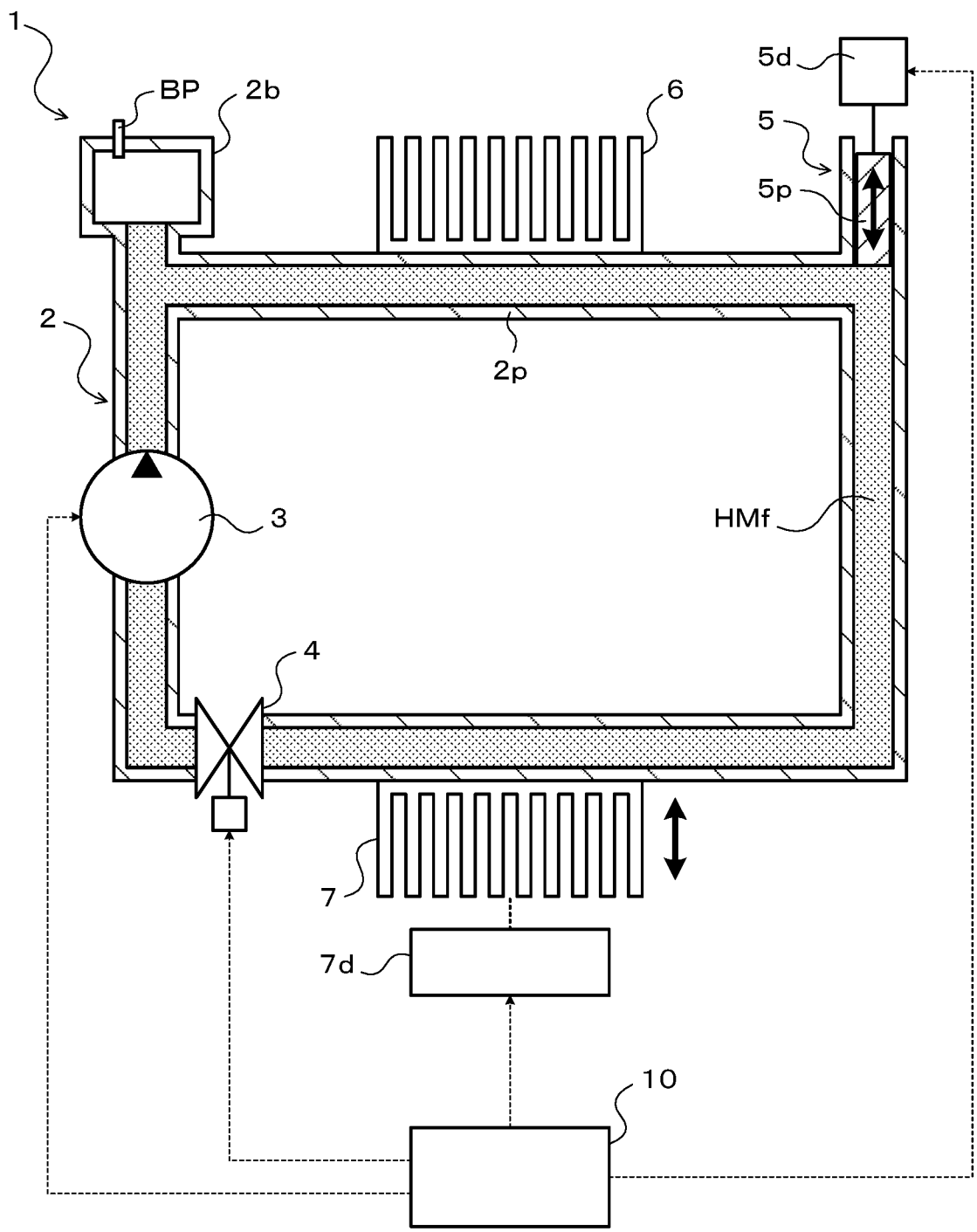
FIG. 1 is a schematic configuration diagram showing an example of a heat absorption and radiation system of the present disclosure.

FIG. 1 is a schematic configuration diagram showing an example of a heat absorption and radiation system 1 of the present disclosure. The heat absorption and radiation system 1 shown in the figure uses a liquid heat medium (liquid refrigerant) HMf containing a rubidium-manganese-iron cyano complex (: $Rb_xMn[Fe(CN)_6]_y$, hereinafter referred to as "RbMnFe complex") that is a phase transition material having bistability. In the present embodiment, the liquid heat medium HMf is obtained by mixing the RbMnFe complex that is powder insoluble in various liquids into a liquid such as polyalphaolefin oil whose properties change little in response to pressure changes. The RbMnFe complex is a charge-transfer phase transition complex that has a network structure in which iron and manganese are three-dimensionally linked by a cyano group and has a crystal structure in which rubidium ions are alternately arranged in holes in the skeleton. The RbMnFe complex exhibits the bistability in two states that are a high-temperature phase in which the valences of manganese and iron are Mn(II)-Fe(III) and a low-temperature phase in which the valences of manganese and iron are Mn(III)-Fe(II).

Figure 2:
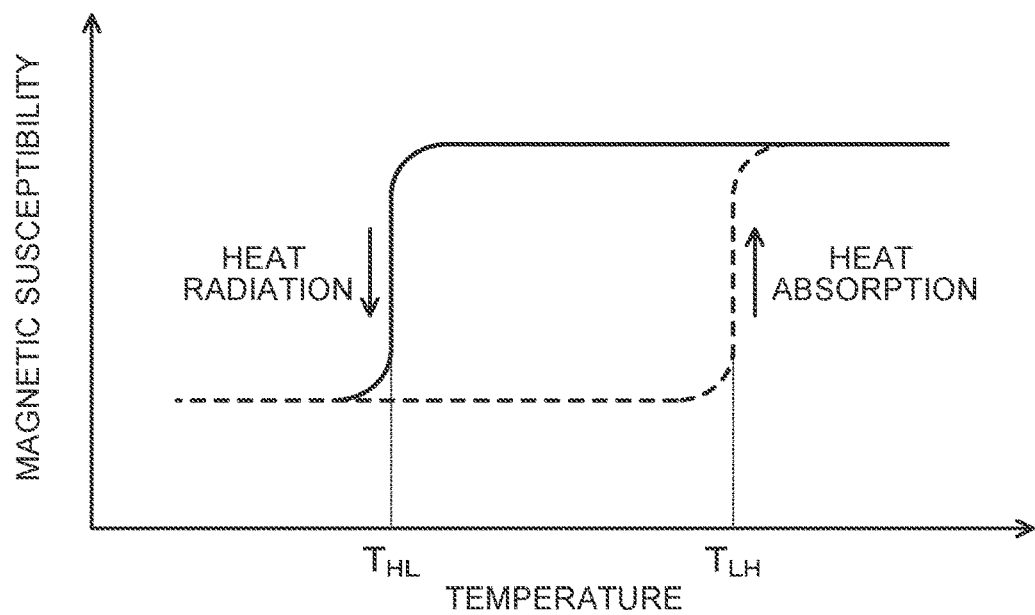
FIG. 2 is a graph showing a relationship between temperature and magnetic susceptibility of a rubidium-manganese-iron cyano complex.
Figure 3:
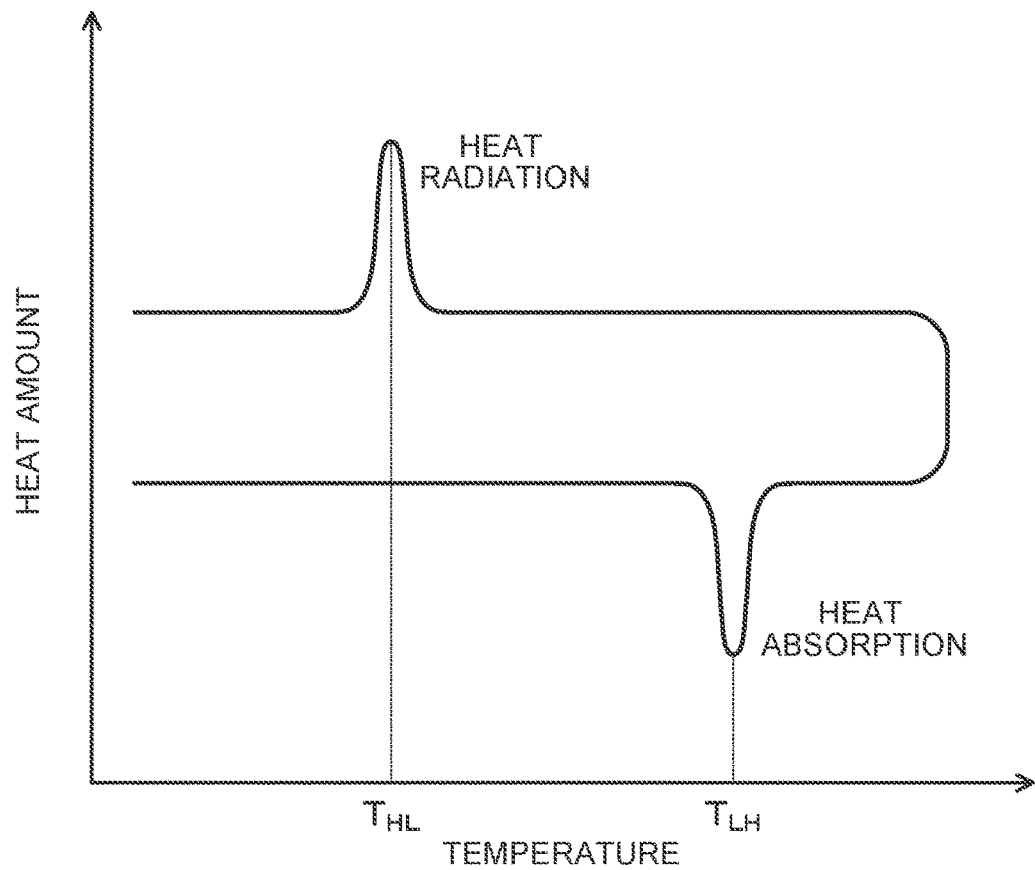
FIG. 3 is a graph showing a relationship between the temperature of the rubidium-manganese-iron cyano complex and a heat amount obtained by a differential scanning calorimeter.
Figure 4A:
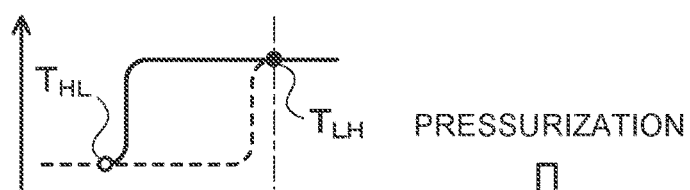
FIG. 4A, FIG. 4B, FIG. 4C, FIG. 4D, FIG. 4E, FIG. 4F, and FIG. 4G are explanatory diagrams showing relationships between a pressure applied to the rubidium-manganese-iron cyano complex and a phase transition temperature.
Figure 4B:
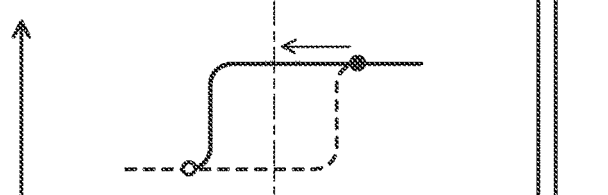
Figure 4C:
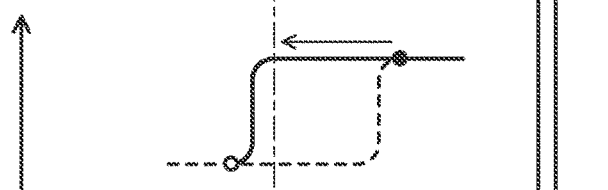
Figure 4D:
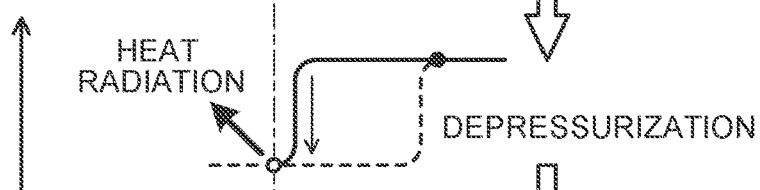
Figure 4E:
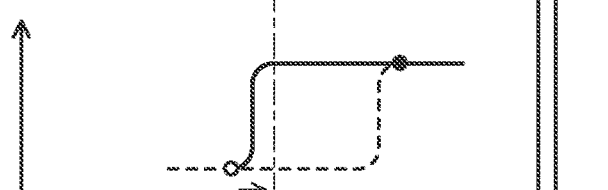
Figure 4F:
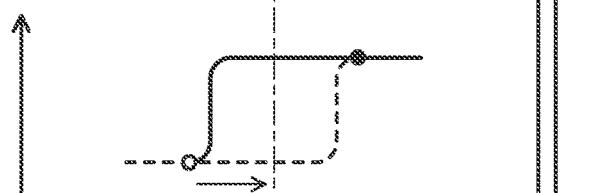
Figure 4G:
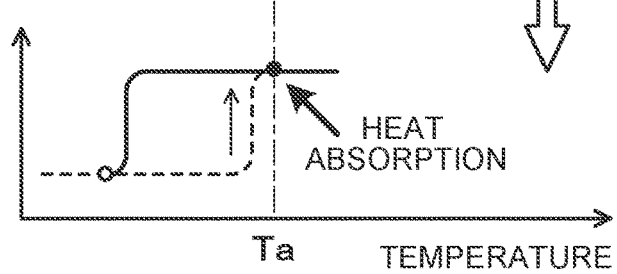

FIG. 2 shows a relationship between temperature and magnetic susceptibility of the RbMnFe complex. FIG. 3 shows a relationship between the temperature of the RbMnFe complex and a heat amount obtained by a differential scanning calorimeter. As can be seen from these figures, when the RbMnFe complex is heated to a first phase transition temperature $T_{LH}$ or higher, phase transition occurs from the low-temperature phase (see the dashed line in FIG. 2) to the high-temperature phase (see the continuous line in FIG. 2) to absorb heat. When the temperature is equal to or lower than a second phase transition temperature $T_{HL}$ that is lower than the first phase transition temperature $T_{LH}$, phase transition occurs from the high-temperature phase to the low-temperature phase to release heat. As shown in FIG. 2, temperature hysteresis occurs along with the phase transition of the RbMnFe complex. As can be seen from FIG. 3, the RbMnFe complex stores the heat absorbed along with the phase transition to the high-temperature phase during a period in which the phase transition occurs from the low-temperature phase to the high-temperature phase and then to the low-temperature phase again.

When the ratio of rubidium to manganese in the RbMnFe complex is changed, the two phase transition temperatures $T_{LH}$, $T_{HL}$ and the difference between the phase transition temperature $T_{LH}$ and the phase transition temperature $T_{HL}$ (hysteresis width) change. In the RbMnFe complex used in the heat absorption and radiation system 1 of the present embodiment, a ratio x of rubidium to manganese is $0.94 \le x \le 1$. Thus, it is possible to reduce the difference between the phase transition temperature $T_{LH}$ and the phase transition temperature $T_{HL}$, and to further increase the rate of change (gradient of change) in the magnetic susceptibility around the phase transition temperatures $T_{LH}$, $T_{HL}$. When the amount of rubidium relative to manganese is reduced, a part of cyano iron is lost and water molecules are coordinated to maintain electrical neutrality.

As shown in FIGS. 4A to 4D, when the RbMnFe complex is pressurized, both the phase transition temperature $T_{HL}$ from the high-temperature phase (see the continuous line in each figure) to the low-temperature phase (see the dashed line in each figure) and the phase transition temperature $T_{LH}$ from the low-temperature phase to the high-temperature phase increase. As the pressure applied to the RbMnFe complex increases, both the phase transition temperatures $T_{HL}$, $T_{LH}$ basically increase. By applying a pressure to the RbMnFe complex, the phase transition temperature $T_{HL}$, from the high-temperature phase to the low-temperature phase that is lower than the phase transition temperature $T_{LH}$ from the low-temperature phase to the high-temperature phase increases. Therefore, the phase transition from the high-temperature phase to the low-temperature phase can be caused to radiate heat without greatly reducing the temperature of the RbMnFe complex. According to experiments and analyses conducted by the inventors, it is found that, when the pressure applied to the RbMnFe complex is released, the phase transition temperature $T_{HL}$, from the high-temperature phase to the low-temperature phase and the phase transition temperature $T_{LH}$ from the low-temperature phase to the high-temperature phase decrease (return to original states) as shown in FIGS. 4D to 4G. By reducing the pressure of the pressurized RbMnFe complex to, for example, a normal pressure, the phase transition from the low-temperature phase to the high-temperature phase can be caused without greatly increasing the temperature of the RbMnFe complex.

When the phase transition temperature $T_{LH}$ of the RbMnFe complex from the low-temperature phase to the high-temperature phase under a normal pressure environment is sufficiently low, the phase transition from the low-temperature phase to the high-temperature phase can be caused without heating the RbMnFe complex and the crystalline state of the RbMnFe complex can be maintained in the high-temperature phase under a normal temperature and normal pressure environment. In this case, the phase transition to the low-temperature phase can be caused by pressurizing the RbMnFe complex under the normal temperature environment without cooling the RbMnFe complex, and the phase transition from the low-temperature phase to the high-temperature phase can be caused under the normal temperature environment by releasing the pressure of the RbMnFe complex back to, for example, the normal pressure without heating the RbMnFe complex. Therefore, the inventors conducted extensive research to further reduce the phase transition temperatures $T_{HL}$, $T_{LH}$ of the RbMnFe complex under the normal pressure environment. As a result of various experiments, the inventors found that the phase transition temperature $T_{LH}$ of the RbMnFe complex from the low-temperature phase to the high-temperature phase under the normal pressure environment can be reduced to the normal temperature range by doping Fe of the RbMnFe complex with trivalent cobalt ions, more specifically, hexacyanocobalt ions.

Figure 5:
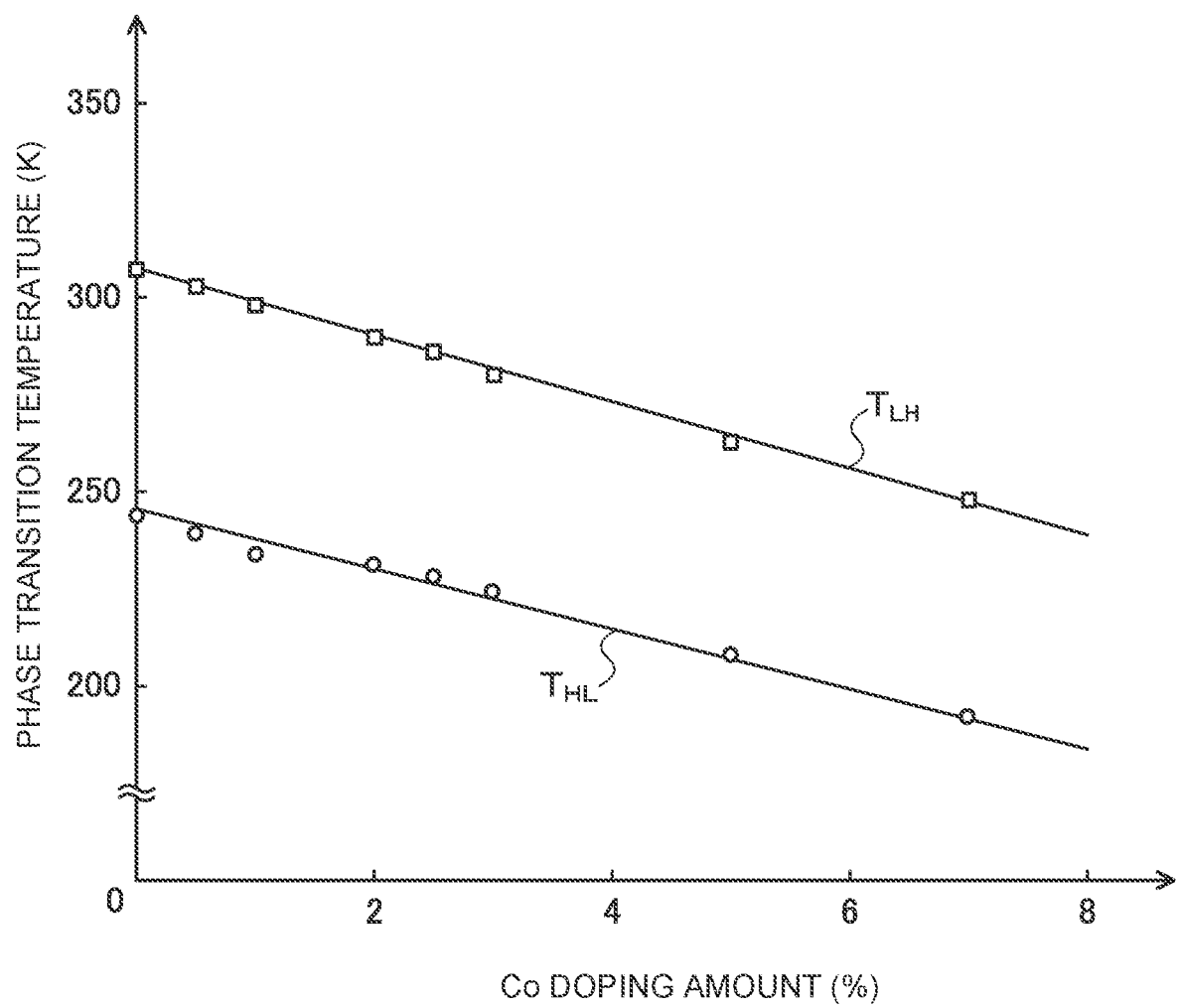
FIG. 5 is a graph showing a relationship between the amount of cobalt doped into the rubidium-manganese-iron cyano complex and the phase transition temperature of the rubidium-manganese-iron cyano complex.

That is, as shown in FIG. 5, both the phase transition temperature $T_{HL}$, of the RbMnFe complex from the high-temperature phase to the low-temperature phase and the phase transition temperature $T_{LH}$ of the RbMnFe complex from the low-temperature phase to the high-temperature phase under the normal pressure environment decrease as the amount of cobalt (hexacyanocobalt ions) doped into Fe of the RbMnFe complex increases. As shown in FIG. 5, when the amount of cobalt doped into the RbMnFe complex is 0 to 7%, the phase transition temperature $T_{HL}$ from the high-temperature phase to the low-temperature phase can be set to a value within a range of 248 K to 307 K and, when the amount of cobalt doped into the RbMnFe complex is 2 to 7%, the phase transition temperature $T_{HL}$ can be set to a value within a range of 248 K to 290 K. Based on such experimental results, the present embodiment adopts a liquid heat medium HMf containing a RbMnFe complex with the cobalt doping amount of 2 to 7%. Thus, under the normal temperature and normal pressure environment, the phase transition to the low-temperature phase can be caused by applying a pressure to the liquid heat medium HMf without cooling the RbMnFe complex, and the phase transition to the high-temperature phase can be caused by releasing the pressure applied to the liquid heat medium HMf without heating the RbMnFe complex.

The heat absorption and radiation system 1 using the liquid heat medium HMf containing the RbMnFe complex described above includes a circulation passage 2, a pump 3 that circulates the liquid heat medium HMf in the circulation passage 2, a valve 4 that opens and closes the circulation passage 2 on an upstream side of the pump 3, a pressurizing device 5 disposed on a downstream side of the pump 3 and on an upstream side of the valve 4, and a control device 10. The circulation passage 2 is an endless passage formed by a heat transfer tube 2p and filled with the liquid heat medium HMf. The outer peripheral surface of the heat transfer tube 2p is covered with a heat insulating material (not shown) except for a part. The circulation passage 2 is provided with a buffer tank 2b that communicates with the circulation passage 2 between the pump 3 and the pressurizing device 5. A plug (breather plug) BP that communicates the inside of the circulation passage 2, that is, the heat transfer tube 2p with outside air (atmosphere) is attached to the buffer tank 2b.

The pump 3 is, for example, an electric pump, and is controlled by the control device 10 to circulate the liquid heat medium HMf in the circulation passage 2 clockwise in FIG. 1. The valve 4 is an on-off valve controlled by the control device 10 to open and close the circulation passage 2 on the upstream side of the pump 3 (behind a suction port) in a flow direction of the liquid heat medium HMf. When the valve 4 is closed, the inflow of the liquid heat medium HMf into the suction port of the pump 3 is restricted. The pressurizing device 5 pressurizes the liquid heat medium HMf present on the upstream side of the valve 4 in the circulation passage 2. The pressurizing device 5 includes a piston 5p disposed on a downstream side of the buffer tank 2b and on the upstream side of the valve 4 to move forward into and backward from the heat transfer tube 2p, and a drive device 5d that is a hydraulic actuator or an electric actuator. The drive device 5d of the pressurizing device 5 is controlled by the control device 10 to move the piston 5p so as to compress the liquid heat medium HMf in the heat transfer tube 2p. The control device 10 includes a computer including a CPU, a ROM, a RAM, and an input and output interface, various drive circuits, various logic ICs, etc.

The heat absorption and radiation system 1 further includes a first heat sink 6 and a second heat sink 7 that can exchange heat with the heat transfer tube 2p constituting the circulation passage 2 and outside air. The first heat sink 6 abuts against (is in close contact with) a portion from which the heat insulating material is removed in the heat transfer tube 2p constituting the circulation passage 2 between the pump 3 and the pressurizing device 5. The second heat sink 7 can abut against (come into close contact with) a portion from which the heat insulating material is removed in the heat transfer tube 2p constituting the circulation passage 2 between the pressurizing device 5 and the valve 4. In the present embodiment, the second heat sink 7 is connected to a drive device 7d controlled by the control device 10. The drive device 7d can separate the second heat sink 7 from the corresponding heat transfer tube 2p and bring the second heat sink 7 into abutment against the heat transfer tube 2p.

Next, an operation of the heat absorption and radiation system 1 structured as described above will be described.

When the operation of the heat absorption and radiation system 1 is stopped, the operation of the pump 3 is stopped and the valve 4 is open. While the operation of the heat absorption and radiation system 1 is stopped, the piston 5p of the pressurizing device 5 is moved by the drive device 5d to an initial position (see FIG. 1) where it has retreated from the circulation passage 2, and the second heat sink 7 is brought into abutment against the corresponding heat transfer tube 2p by the drive device 7d. The liquid heat medium HMf applied to the heat absorption and radiation system 1 is obtained by mixing the RbMnFe complex into liquid polyalphaolefin oil etc., and the RbMnFe complex (Fe) is doped with cobalt (hexacyanocobalt ions). Therefore, when the operation of the heat absorption and radiation system 1 is stopped under the normal temperature and normal pressure environment, the crystalline state of the RbMnFe complex contained in the liquid heat medium HMf in the circulation passage 2 is maintained in the high-temperature phase. Hereinafter, the high-temperature phase is shown in a fine dot pattern as shown in FIG. 1.

Figure 6:
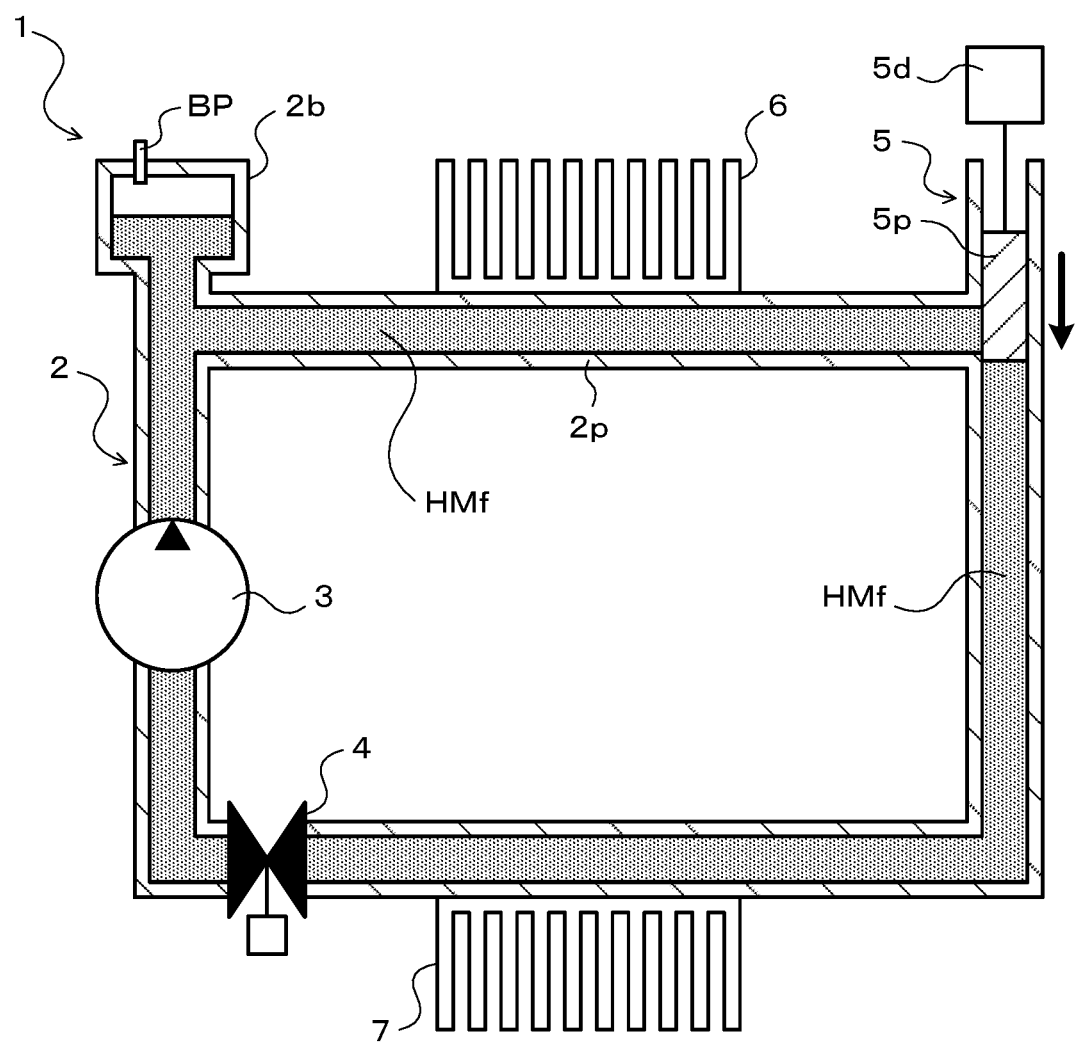
FIG. 6 is a schematic configuration diagram illustrating an operation of the heat absorption and radiation system shown in FIG. 1.
Figure 7:
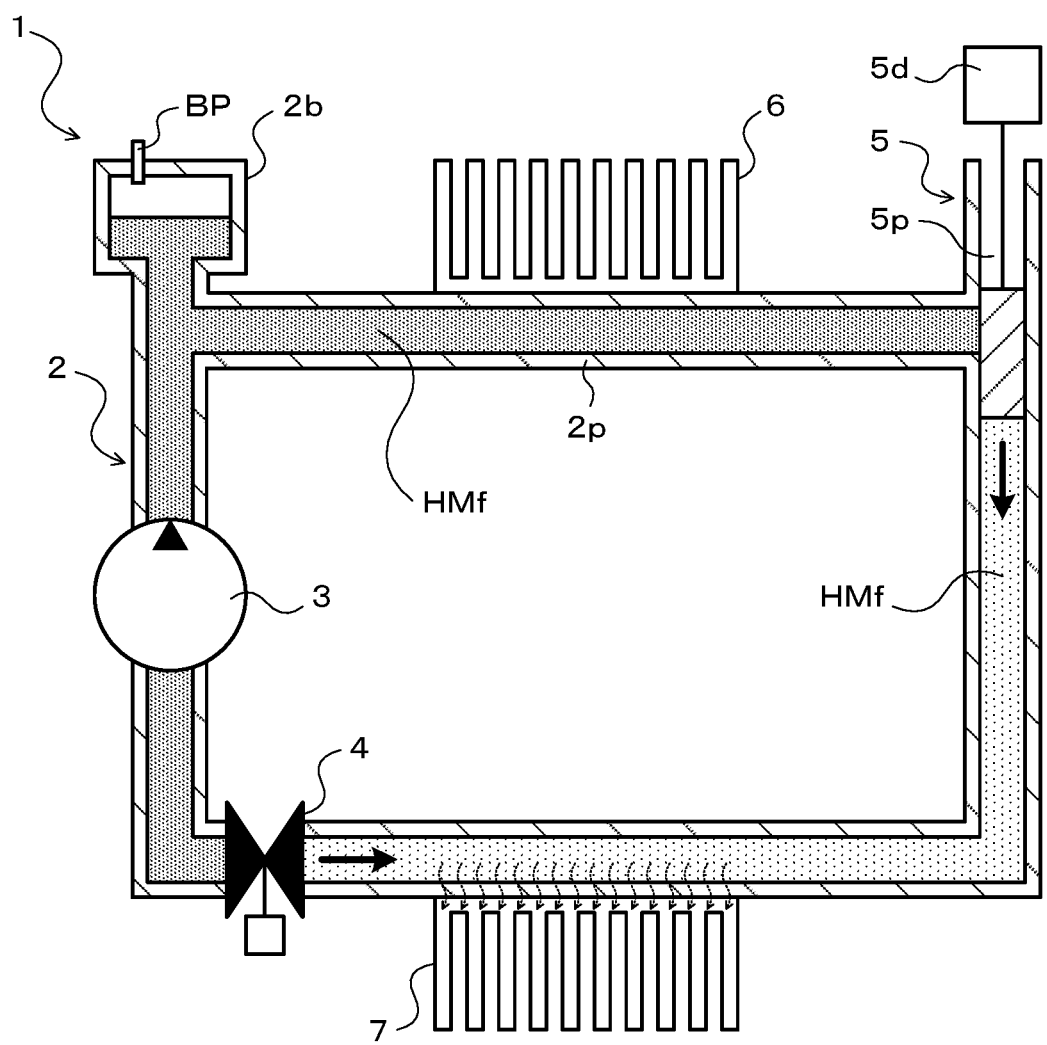
FIG. 7 is a schematic configuration diagram illustrating the operation of the heat absorption and radiation system shown in FIG. 1.

When the heat absorption and radiation system 1 is instructed to start operating, the control device 10 of the heat absorption and radiation system 1 closes the valve 4 and controls the drive device 5d of the pressurizing device 5 to cause the piston 5p to close the circulation passage 2 as shown in FIG. 6. At this time, as shown in FIG. 6, a part of the liquid heat medium HMf in the circulation passage 2 is pushed toward the pump 3 by the piston 5p and flows into the buffer tank 2b. Subsequently, as shown in FIG. 7, the control device 10 controls the drive device 5d of the pressurizing device 5 to cause the piston 5p to pressurize the liquid heat medium HMf present on the upstream side of the valve 4 in the circulation passage 2. In the present embodiment, a pressure of, for example, about 100 MPa is applied to the liquid heat medium HMf from the piston 5p.

Figure 8:
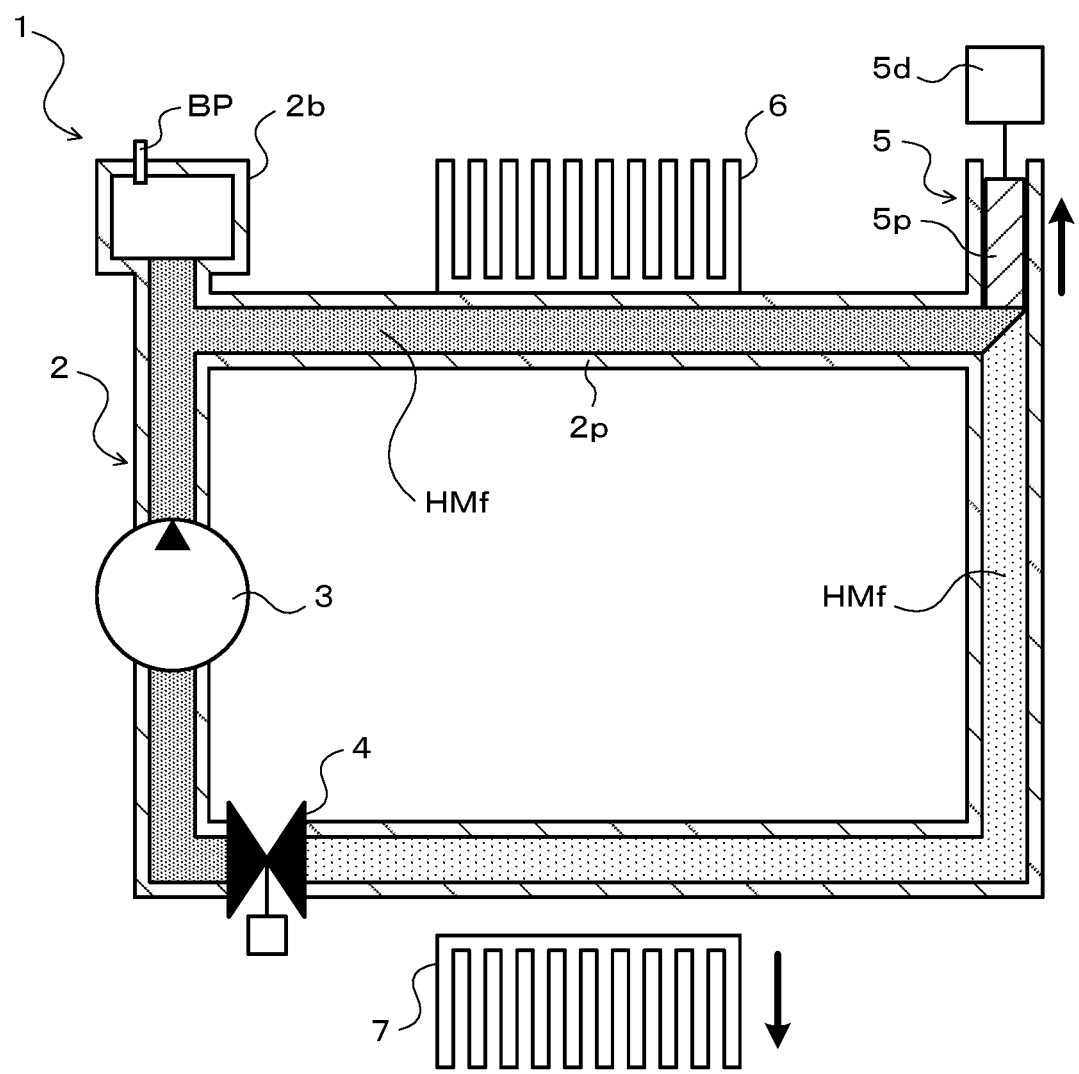
FIG. 8 is a schematic configuration diagram illustrating the operation of the heat absorption and radiation system shown in FIG. 1.

Thus, the RbMnFe complex contained in the liquid heat medium HMf between the piston 5p (pressurizing device 5) and the closed valve 4 in the circulation passage 2 undergoes phase transition from the high-temperature phase to the low-temperature phase under the normal temperature environment in response to an increase in the phase transition temperature $T_{HL}$ from the high-temperature phase to the low-temperature phase by the pressurization. Along with this, heat is released to the second heat sink 7 via the heat transfer tube 2p. Hereinafter, the low-temperature phase is shown in a sparse dot pattern as shown in FIG. 7. The control device 10 determines that the phase transition of the RbMnFe complex from the high-temperature phase to the low-temperature phase is completed when, for example, a predetermined period has elapsed from the start of pressurization of the liquid heat medium HMf. As shown in FIG. 8, the control device 10 controls the drive device 5d to move the piston 5p to the initial position to release the pressure on the liquid heat medium HMf, and controls the drive device 7d to separate the second heat sink 7 from the corresponding heat transfer tube 2p. By separating the second heat sink 7 from the heat transfer tube 2p, it is possible to reduce the occurrence of a case where the heat released (transferred) to the second heat sink 7 is absorbed via the heat transfer tube 2p into the liquid heat medium HMf present between the pressurizing device 5 and the valve 4 in the circulation passage 2.

Figure 9:
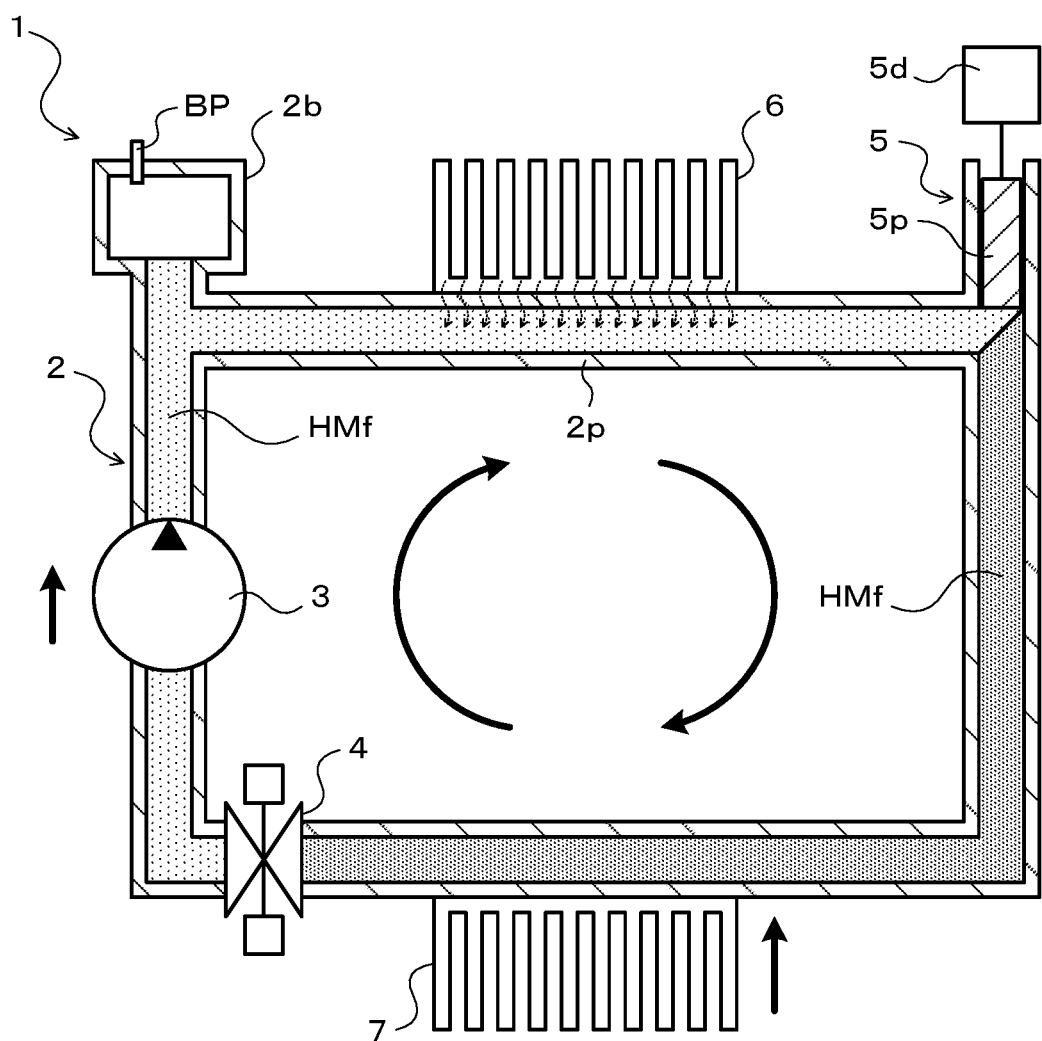
FIG. 9 is a schematic configuration diagram illustrating the operation of the heat absorption and radiation system shown in FIG. 1.

After the pressurization by the pressurizing device 5 is terminated, the control device 10 opens the valve 4. The control device 10 operates the pump 3 for a predetermined period so that, as shown in FIG. 9, the liquid heat medium HMf present on the downstream side of the piston 5p (pressurizing device 5) and on the upstream side of the valve 4 in the circulation passage 2 is transferred to the downstream side of the valve 4 (pump 3 side) and the upstream side of the pressurizing device 5 (piston 5p). The liquid heat medium HMf pressurized on the downstream side of the pressurizing device 5 and on the upstream side of the valve 4 is transferred by the pump 3 to the downstream side of the valve 4 and the upstream side of the pressurizing device 5, and communicates with the outside air (atmosphere) via a clearance etc. in the plug BP and the pump 3. Therefore, the pressure applied to the liquid heat medium HMf is released. Thus, the RbMnFe complex contained in the liquid heat medium HMf on the downstream side of the valve 4 and on the upstream side of the pressurizing device 5 undergoes phase transition from the low-temperature phase to the high-temperature phase under the normal temperature environment in response to a decrease in the phase transition temperature $T_{LH}$ from the low-temperature phase to the high-temperature phase by the decrease in the pressure (return to the normal pressure). Along with this, heat is absorbed from the surrounding air etc. via the first heat sink 6. Accordingly, the substantially entire liquid heat medium HMf in the circulation passage 2 is in the high-temperature phase (see FIG. 1).

After the pump 3 is stopped, the control device 10 controls the drive device 7d to bring the second heat sink 7 into abutment against the corresponding heat transfer tube 2p. The control device 10 determines that the phase transition of the RbMnFe complex from the low-temperature phase to the high-temperature phase is completed when, for example, a predetermined period has elapsed from the stop of the pump 3. Then, the control device 10 repeatedly closes the valve 4, pressurizes the liquid heat medium HMf by the pressurizing device 5, moves (separates) the second heat sink 7, opens the valve 4, transfers the liquid heat medium HMf by the pump 3, and moves the second heat sink 7 (brings the second heat sink 7 into abutment). As a result, the heat absorption and radiation system 1 can function as a heat pump that transfers heat from a low-temperature portion to a high-temperature portion via the liquid heat medium HMf.

As described above, the heat absorption and radiation system 1 pressurizes the liquid heat medium HMf containing the RbMnFe complex to cause the RbMnFe complex to undergo the phase transition from the high-temperature phase to the low-temperature phase, thereby releasing heat from the liquid heat medium HMf. That is, when the RbMnFe complex is pressurized, the phase transition temperature $T_{HL}$ from the high-temperature phase to the low-temperature phase and the phase transition temperature $T_{LH}$ from the low-temperature phase to the high-temperature phase increase. By pressurizing the liquid heat medium HMf, the phase transition temperature $T_{HL}$ from the high-temperature phase to the low-temperature phase that is lower than the phase transition temperature $T_{LH}$ from the low-temperature phase to the high-temperature phase increases. Therefore, the liquid heat medium HMf can release heat by the phase transition of the RbMnFe complex from the high-temperature phase to the low-temperature phase without cooling the liquid heat medium HMf (without greatly reducing the temperature). As described above, when the pressure of the pressurized RbMnFe complex is reduced to a temperature around the atmospheric pressure, the phase transition temperature $T_{HL}$, from the high-temperature phase to the low-temperature phase and the phase transition temperature $T_{LH}$ from the low-temperature phase to the high-temperature phase decrease. By returning the pressure of the pressurized liquid heat medium HMf to the normal pressure, for example, by opening it to the atmosphere, the RbMnFe complex can undergo the phase transition from the low-temperature phase to the high-temperature phase without heating the liquid heat medium HMf (without greatly increasing the temperature). By repeatedly applying the pressure to and releasing the pressure from the liquid heat medium HMf, heat can be transferred from the low-temperature portion to the high-temperature portion via the liquid heat medium HMf. As a result, it is possible to realize the heat absorption and radiation system 1 that functions as a heat pump by efficiently absorbing and releasing heat through effective utilization of the characteristics of the RbMnFe complex (pressure-calorific effect). The pressurized liquid heat medium HMf may be depressurized to a pressure higher than the atmospheric pressure or to a pressure equal to or lower than the atmospheric pressure depending on a requested heat absorption amount.

In the above embodiment, cobalt (hexacyanocobalt ions) is doped into Fe of the RbMnFe complex contained in the liquid heat medium HMf. Therefore, the phase transition temperature $T_{LH}$ of the RbMnFe complex from the low-temperature phase to the high-temperature phase under the normal pressure environment can be reduced to the normal temperature range. Thus, under the normal temperature and normal pressure environment, the phase transition to the low-temperature phase can be caused by pressurizing the liquid heat medium HMf by the pressurizing device 5 without cooling the RbMnFe complex, and the phase transition to the high-temperature phase can be caused by terminating the pressurization of the liquid heat medium HMf to return the pressure of the RbMnFe complex to the normal pressure without heating the RbMnFe complex.

In the above embodiment, the liquid heat medium HMf is obtained by mixing the RbMnFe complex (powder) into a liquid such as polyalphaolefin oil. That is, the RbMnFe complex is powder insoluble in various liquids, and its heat absorption and radiation performance is maintained even when it is encapsulated in a liquid. By encapsulating the RbMnFe complex (powder) in a liquid, a pressure (hydraulic pressure) can uniformly be applied to each powder particle. Thus, in the heat absorption and radiation system 1 using the liquid heat medium HMf containing the RbMnFe complex, it is possible to realize stable heat absorption and radiation while simplifying the configuration compared to a heat pump that utilizes gas-liquid phase transition.

The heat absorption and radiation system 1 includes the circulation passage 2, the pump 3 that circulates the liquid heat medium HMf in the circulation passage 2, the valve 4 that opens and closes the circulation passage 2 on the upstream side of the pump 3, and the pressurizing device 5 that pressurizes, on the downstream side of the pump 3, the liquid heat medium HMf present on the upstream side of the valve 4 in the circulation passage 2. By pressurizing the liquid heat medium HMf present on the upstream side of the valve 4 in the circulation passage 2 by the pressurizing device 5 with the pump 3 stopped and the valve 4 closed, the RbMnFe complex contained in the liquid heat medium HMf present between the pressurizing device 5 and the valve 4 in the circulation passage 2 can undergo the phase transition from the high-temperature phase to the low-temperature phase, thereby releasing heat. After the pressurization by the pressurizing device 5 is terminated, the valve 4 is opened and the pump 3 transfers the liquid heat medium HMf present on the downstream side of the pressurizing device 5 and on the upstream side of the valve 4 in the circulation passage 2 to the downstream side of the valve 4 and the upstream side of the pressurizing device 5. Therefore, the pressure applied to the liquid heat medium HMf on the downstream side of the pressurizing device 5 and on the upstream side of the valve 4 is released on the downstream side of the valve 4 and on the upstream side of the pressurizing device 5. Thus, the RbMnFe complex can undergo the phase transition from the low-temperature phase to the high-temperature phase, thereby absorbing heat. As a result, by repeatedly closing the valve 4, pressurizing the liquid heat medium HMf by the pressurizing device 5, opening the valve 4, and transferring the liquid heat medium HMf by the pump 3, the heat absorption and radiation system 1 can function as a heat pump that transfers heat from the low-temperature portion to the high-temperature portion via the liquid heat medium HMf.

Figure 10:
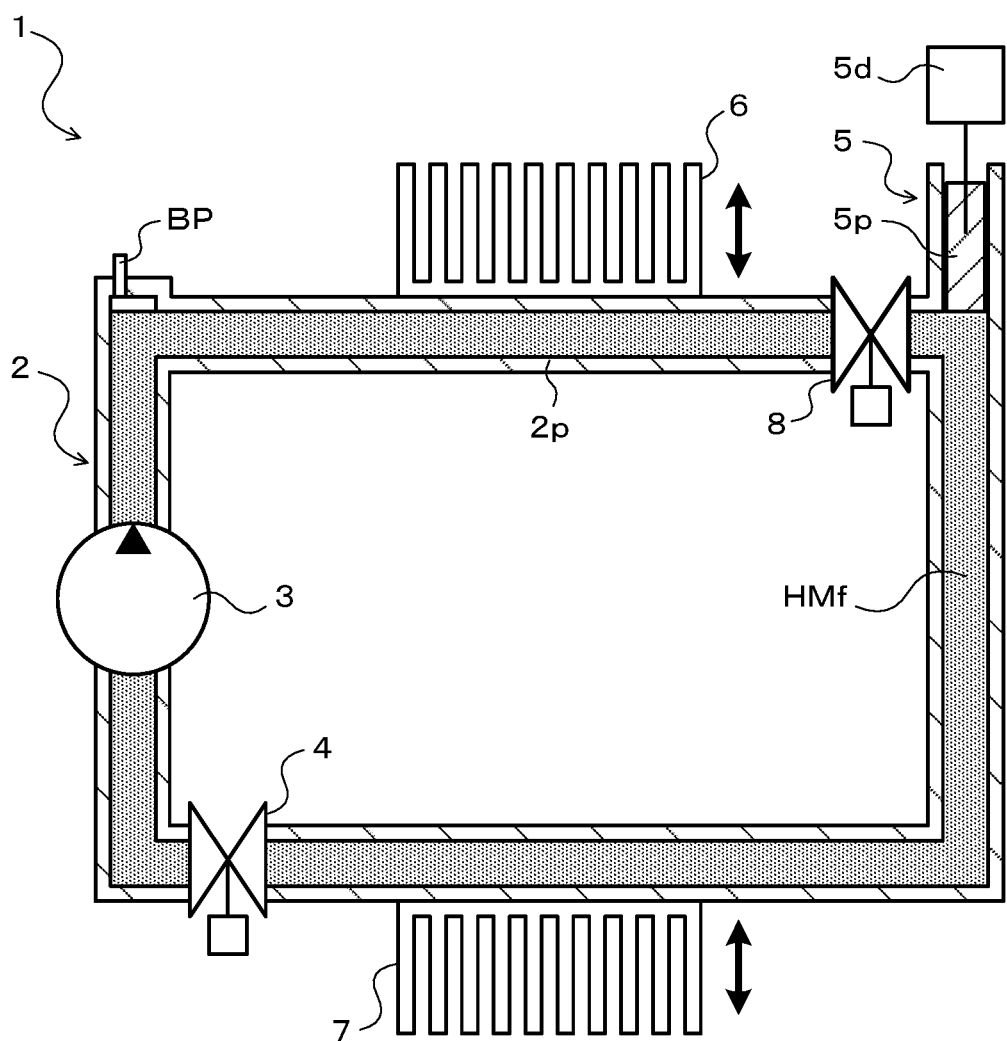
FIG. 10 is a schematic configuration diagram showing another example of the heat absorption and radiation system of the present disclosure.

In the circulation passage 2, as in a heat absorption and radiation system 1B shown in FIG. 10, a second valve 8 that opens and closes the circulation passage 2 on the downstream side of the pump 3 and on the upstream side of the pressurizing device 5 may be provided near the pressurizing device 5. By closing the second valve 8 when the pressurizing device 5 pressurizes the liquid heat medium HMf on the upstream side of the valve 4, it is possible to suppress the inflow of the liquid heat medium HMf pressurized by the pressurizing device 5 into the pump 3 side. As a result, in the heat absorption and radiation system 1B, the buffer tank $2b$ can be omitted or the volume of the buffer tank $2b$ can be reduced as shown in the figure.

There is a certain degree of difference between the pressure necessary to start the phase transition of the RbMnFe complex contained in the liquid heat medium HMf from the high-temperature phase to the low-temperature phase under the normal temperature environment and the pressure necessary to complete the phase transition of the RbMnFe complex from the high-temperature phase to the low-temperature phase under the normal temperature environment. Once the phase transition of the RbMnFe complex from the high-temperature phase to the low-temperature phase is started, the heat absorption and radiation cycle can be secured even if the pressure applied to the RbMnFe complex is released before the phase transition is completed. Therefore, the pressure applied to the liquid heat medium HMf from the pressurizing device 5 may be changed depending on the heat amount (temperature gradient) requested in the heat absorption and radiation system 1, 1B. Thus, it is possible to suppress unnecessary pressurization of the liquid heat medium HMf and further improve the energy efficiency in the heat absorption and radiation system 1, 1B.

By doping Fe of the RbMnFe complex with trivalent cobalt ions (hexacyanocobalt ions), the phase transition temperature $T_{LH}$ of the RbMnFe complex from the low-temperature phase to the high-temperature phase under the normal pressure environment can be reduced to the normal temperature range. According to the research conducted by the inventors, it is found that the phase transition temperature of the RbMnFe complex from the low-temperature phase to the high-temperature phase under the normal pressure environment decreases to the normal temperature range or conversely increases by doping Mn (manganese) of the RbMnFe complex with divalent metal ions. That is, as shown in FIG. 11, the phase transition temperature $T_{LH}$ of the RbMnFe complex from the low-temperature phase to the high-temperature phase under the normal pressure environment can be reduced to the normal temperature range by doping Mn (manganese) of the RbMnFe complex with divalent copper (Cu) ions, divalent nickel (Ni) ions, or divalent zinc (Zn) ions.

More specifically, when the amount of divalent copper (Cu) ions doped into Mn of the RbMnFe complex is set to, for example, 6 to 8% or the amount of doped divalent nickel (Ni) ions or divalent zinc (Zn) ions is set to, for example, 2 to 8%, the phase transition temperature $T_{HL}$ can be set to a value within a range of 250 K to 290 K. Thus, even when copper, nickel, or zinc is used as a dopant for the RbMnFe complex, under the normal temperature and normal pressure environment, the phase transition to the low-temperature phase can be caused by applying a pressure to the liquid heat medium HMf without cooling the RbMnFe complex, and the phase transition to the high-temperature phase can be caused by releasing the pressure applied to the liquid heat medium HMf without heating the RbMnFe complex. As shown in FIG. 11, even when Mn of the RbMnFe complex is doped with divalent iron (Fe) ions, the phase transition temperature $T_{LH}$ can be reduced if the doping amount is reduced (e.g., 4% or lower).

Figure 11:
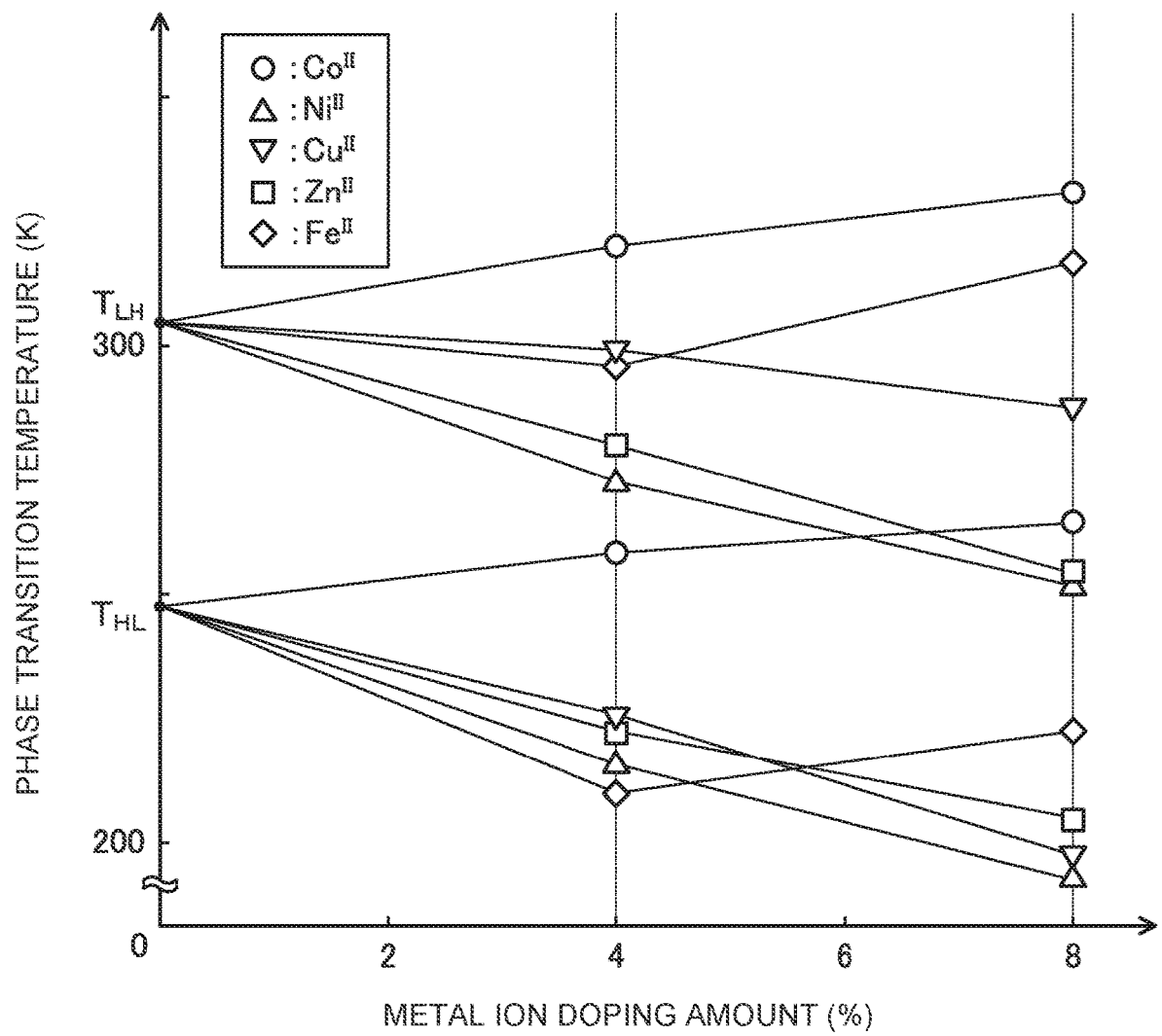
FIG. 11 is a graph showing a relationship between the amount of divalent metal ions doped into the rubidium-manganese-iron cyano complex and the phase transition temperature of the rubidium-manganese-iron cyano complex.

When Mn (manganese) of the RbMnFe complex is doped with divalent cobalt (Co) ions, the phase transition temperature $T_{LH}$ of the RbMnFe complex from the low-temperature phase to the high-temperature phase under the normal pressure environment conversely increases as shown in FIG. 11. By using divalent cobalt ions as the dopant for the RbMnFe complex, it is possible to realize a heat absorption and radiation system that operates under a high-temperature environment.

Figure 12:
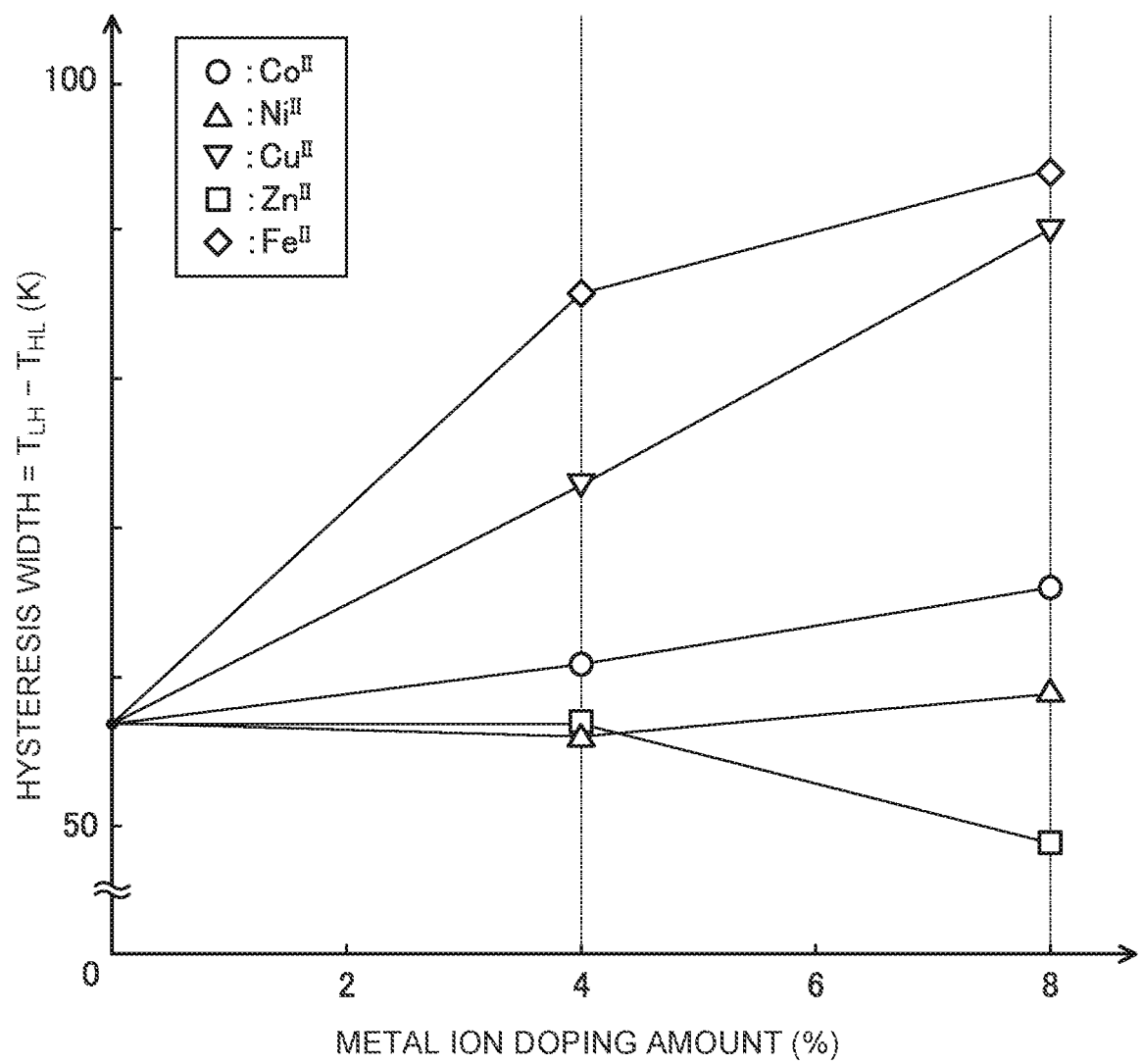
FIG. 12 is a graph showing a relationship between the amount of divalent metal ions doped into the rubidium-manganese-iron cyano complex and a hysteresis width of the phase transition temperature of the rubidium-manganese-iron cyano complex.

As shown in FIG. 12, when zinc is used as the dopant for the RbMnFe complex, the difference between the phase transition temperature $T_{LH}$ and the phase transition temperature $T_{HL}$ (hysteresis width) can be reduced. When the doping amount is set to 4 to 8%, the difference between the phase transition temperature $T_{LH}$ and the phase transition temperature $T_{HL}$ (hysteresis width) can further be reduced. Thus, it is possible to reduce the energy for pressurizing the liquid heat medium HMf, that is, the load on the pressurizing device 5. As shown in FIG. 12, even when nickel is used as the dopant for the RbMnFe complex, an increase in the difference between the phase transition temperature $T_{LH}$ and the phase transition temperature $T_{HL}$ (hysteresis width) can be suppressed satisfactorily.

Figure 13:
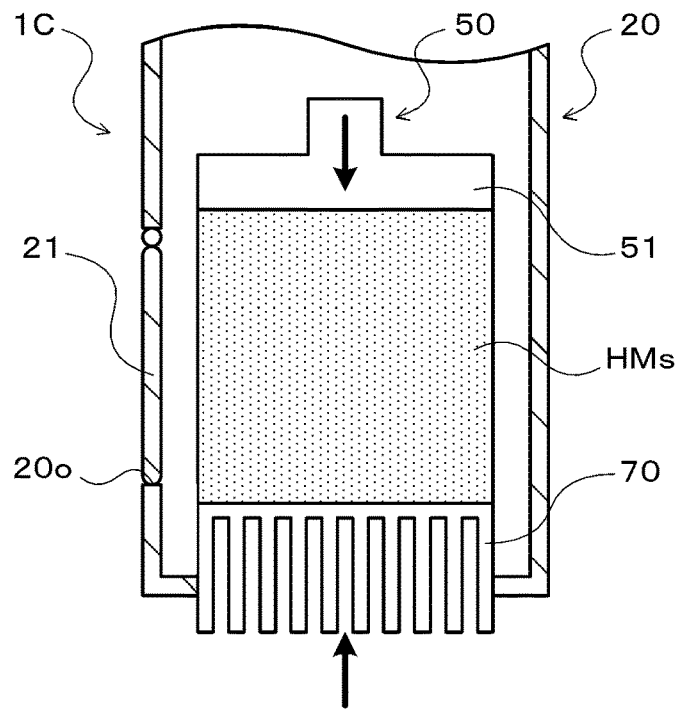
FIG. 13 is a schematic configuration diagram showing still another example of the heat absorption and radiation system of the present disclosure.

FIG. 13 is a schematic configuration diagram showing another heat absorption and radiation system 1C of the present disclosure. The heat absorption and radiation system 1C shown in the figure uses, instead of the liquid heat medium HMf described above, a solid heat medium HMs obtained by solidifying the RbMnFe complex (powder) doped with cobalt (hexacyanocobalt) into a substantially rectangular parallelepiped or substantially cubic shape by using a binder etc. The heat absorption and radiation system 1C includes a heat insulating container 20 that houses (holds) the solid heat medium HMs, a pressurizing device 50 that pressurizes the solid heat medium HMs, a heat sink 70, and a control device (not shown).

The heat insulating container 20 includes an openable and closable door 21 that opens and closes an opening 20o formed in a side wall of the heat insulating container 20 near the solid heat medium HMs disposed inside the heat insulating container 20. The openable and closable door 21 is opened and closed by an opening and closing mechanism (not shown) controlled by the control device of the heat absorption and radiation system 1C. By opening the openable and closable door 21, outside air can be brought into contact with the solid heat medium HMs. The pressurizing device 50 includes a piston 51 that can move toward and away from a pressure receiving surface (upper surface in FIG. 13) of the solid heat medium HMs disposed inside the heat insulating container 20, and a drive device (not shown). The drive device is controlled by the control device of the heat absorption and radiation system 1C to move the piston 51 relative to the solid heat medium HMs so as to apply a pressure to the pressure receiving surface, and also to separate the piston 51 from the solid heat medium HMs. The heat sink 70 is movably supported by the heat insulating container 20 so that a part (lower part in FIG. 13) always protrudes (is exposed) to the outside from the heat insulating container 20, and can abut against (come into close contact with) a heat transfer surface (lower surface in FIG. 13) located opposite to the pressure receiving surface of the solid heat medium HMs. The heat sink 70 is connected to a heat sink drive device (not shown) controlled by the control device 10. The heat sink drive device can separate the heat sink 70 from the solid heat medium HMs and bring the heat sink 70 into abutment against the heat transfer surface of the solid heat medium HMs.

Figure 14:
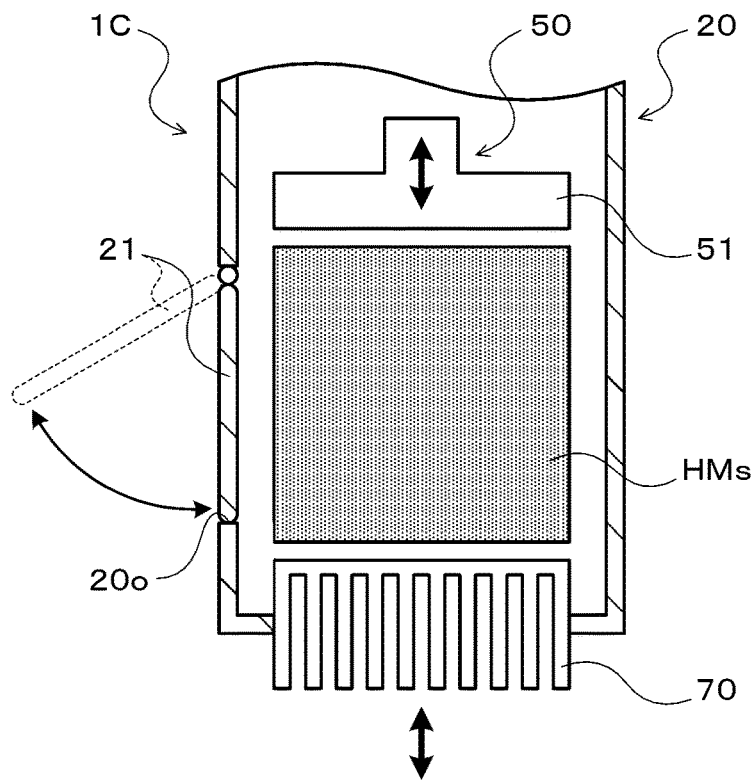
FIG. 14 is a schematic configuration diagram illustrating an operation of the heat absorption and radiation system shown in FIG. 13.

When the operation of the heat absorption and radiation system 1C structured as described above is stopped, the crystalline state of the RbMnFe complex contained in the solid heat medium HMs is maintained in the high-temperature phase, and the openable and closable door 21 of the heat insulating container 20 is closed. When the heat absorption and radiation system 1C is instructed to start operating, the control device of the heat absorption and radiation system 1 controls the heat sink drive device to bring the heat sink 70 into abutment against the heat transfer surface of the solid heat medium HMs as shown in FIG. 14. The control device controls the drive device of the pressurizing device 50 to move the piston 51 relative to the solid heat medium HMs and apply a pressure (e.g., about 100 Mpa) to the pressure receiving surface of the solid heat medium HMs. Thus, the RbMnFe complex contained in the solid heat medium HMs undergoes phase transition from the high-temperature phase to the low-temperature phase under the normal temperature environment in response to an increase in the phase transition temperature $T_{HL}$ from the high-temperature phase to the low-temperature phase by the pressurization. Along with this, heat is released to the heat sink 70.

The control device 10 of the heat absorption and radiation system 1C determines that the phase transition of the RbMnFe complex from the high-temperature phase to the low-temperature phase is completed when, for example, a predetermined period has elapsed from the start of pressurization of the solid heat medium HMs. As shown in FIG. 13, the control device controls the drive device 5d of the pressurizing device 50 to move the piston 51 to the initial position to release the pressure on the solid heat medium HMs. The control device controls the heat sink drive device to separate the heat sink 70 from the solid heat medium HMs (see FIG. 13). Thus, it is possible to reduce the occurrence of a case where the heat released (transferred) to the heat sink 70 is absorbed by the solid heat medium HMs.

After the pressurization by the pressurizing device 50 is terminated, the control device of the heat absorption and radiation system 1C controls the opening and closing mechanism to open the openable and closable door 21 as shown by the dashed line in FIG. 13. Thus, the solid heat medium HMs undergoes phase transition from the low-temperature phase to the high-temperature phase under the normal temperature environment in response to a decrease in the phase transition temperature $T_{LH}$ from the low-temperature phase to the high-temperature phase by the termination of the pressurization by the pressurizing device 50, that is, the decrease in the pressure, thereby absorbing heat from air flowing through the opening 20o of the heat insulating container 20. As a result, the substantially entire solid heat medium HMs in the heat insulating container 20 is in the high-temperature phase. The control device of the heat absorption and radiation system 1C determines that the phase transition of the RbMnFe complex from the low-temperature phase to the high-temperature phase is completed when, for example, a predetermined period has elapsed from the opening of the openable and closable door 21, and controls the opening and closing mechanism to close the openable and closable door 21. Then, the control device of the heat absorption and radiation system 1C repeatedly moves the heat sink 70 (brings the heat sink 70 into abutment), pressurizes the solid heat medium HMs by the pressurizing device 50, moves (separates) the heat sink 70, and opens and closes the openable and closable door 21. As a result, the heat absorption and radiation system 1C can function as a heat pump that transfers heat from a low-temperature portion to a high-temperature portion via the liquid heat medium HMf.

In the heat absorption and radiation system 1C as well, there is a certain degree of difference between the pressure necessary to start the phase transition of the RbMnFe complex contained in the solid heat medium HMs from the high-temperature phase to the low-temperature phase under the normal temperature environment and the pressure necessary to complete the phase transition of the RbMnFe complex from the high-temperature phase to the low-temperature phase under the normal temperature environment. Once the phase transition of the RbMnFe complex from the high-temperature phase to the low-temperature phase is started, the heat absorption and radiation cycle can be secured by releasing the pressure applied to the RbMnFe complex before the phase transition is completed. Therefore, the pressure applied to the solid heat medium HMs from the pressurizing device 50 may be changed depending on the heat amount (temperature gradient) requested in the heat absorption and radiation system 1C. Thus, it is possible to suppress unnecessary pressurization of the solid heat medium HMs and further improve the energy efficiency in the heat absorption and radiation system 1C and the durability of the solid heat medium HMs. In the heat absorption and radiation system 1C, the strength of the solid heat medium HMs can be secured easily. Thus, it is possible to reduce the need to consider the pressure resistance of the solid heat medium HMs etc.

As described above, the heat absorption system of the present disclosure is a heat absorption and radiation system (1, 1B, 1C) using a heat medium (HMf, HMs) containing a rubidium-manganese-iron cyano complex. The heat absorption and radiation system is configured to release heat from the heat medium (HMf, HMs) by applying a pressure to the heat medium (HMf, HMs) and causing phase transition of the rubidium-manganese-iron cyano complex from a high-temperature phase to a low-temperature phase, absorb heat into the heat medium (HMf, HMs) by releasing the pressure applied to the heat medium (HMf, HMs) and causing phase transition of the rubidium-manganese-iron cyano complex from the low-temperature phase to the high-temperature phase, and repeat application of the pressure to and release of the pressure from the heat medium (HMf, HMs).

The heat absorption and radiation system of the present disclosure releases heat from the heat medium containing the rubidium-manganese-iron cyano complex by applying the pressure to the heat medium and causing the phase transition of the rubidium-manganese-iron cyano complex from the high-temperature phase to the low-temperature phase. That is, when the pressure is applied to the rubidium-manganese-iron cyano complex, the phase transition temperature from the high-temperature phase to the low-temperature phase and the phase transition temperature from the low-temperature phase to the high-temperature phase increase. By applying the pressure to the heat medium, the phase transition temperature from the high-temperature phase to the low-temperature phase that is lower than the phase transition temperature from the low-temperature phase to the high-temperature phase increases. Therefore, the heat medium can release heat by the phase transition of the rubidium-manganese-iron cyano complex from the high-temperature phase to the low-temperature phase without greatly reducing the temperature of the heat medium. The inventors found that, when the pressure applied to the rubidium-manganese-iron cyano complex is released, the phase transition temperature from the high-temperature phase to the low-temperature phase and the phase transition temperature from the low-temperature phase to the high-temperature phase decrease. By releasing the pressure applied to the heat medium, the rubidium-manganese-iron cyano complex can undergo the phase transition from the low-temperature phase to the high-temperature phase without greatly increasing the temperature of the heat medium. By repeating the application of the pressure to and the release of the pressure from the heat medium, heat can be transferred from the low-temperature portion to the high-temperature portion via the heat medium. As a result, it is possible to realize the heat absorption and radiation system that functions as a heat pump by efficiently absorbing and releasing heat through effective utilization of the characteristics of the rubidium-manganese-iron cyano complex.

Iron of the rubidium-manganese-iron cyano complex may be doped with cobalt.

Thus, the phase transition temperature of the rubidium-manganese-iron cyano complex from the low-temperature phase to the high-temperature phase under the normal pressure environment can be reduced to the normal temperature range. As a result, under the normal temperature and normal pressure environment, the phase transition to the low-temperature phase can be caused by pressurizing the heat medium without cooling the rubidium-manganese-iron cyano complex, and the phase transition to the high-temperature phase can be caused by terminating the pressurization of the heat medium to return the pressure of the rubidium-manganese-iron cyano complex to the normal pressure without heating the rubidium-manganese-iron cyano complex.

Manganese of the rubidium-manganese-iron cyano complex may be doped with divalent metal ions.

Thus, the phase transition temperature of the rubidium-manganese-iron cyano complex from the low-temperature phase to the high-temperature phase under the normal pressure environment can be reduced to the normal temperature range or conversely increased.

The heat medium may be a liquid heat medium (HMf) obtained by mixing the rubidium-manganese-iron cyano complex into a liquid.

That is, the rubidium-manganese-iron cyano complex is powder insoluble in various liquids, and its heat absorption and radiation performance is maintained even when it is encapsulated in a liquid. By encapsulating the powder in a liquid, a pressure (hydraulic pressure) can uniformly be applied to each powder particle. Thus, in the heat absorption and radiation system using the liquid heat medium containing the rubidium-manganese-iron cyano complex, it is possible to realize stable heat absorption and radiation while simplifying the configuration compared to a heat pump that utilizes gas-liquid phase transition.

The heat absorption and radiation system (1, 1B) may include a circulation passage (2), a pump (3) configured to circulate the liquid heat medium (HMf) in the circulation passage (2), a valve (4) configured to open and close the circulation passage (2) on an upstream side of the pump (3), and a pressurizing device (5) configured to pressurize, on a downstream side of the pump (3), the liquid heat medium (HMf) present on an upstream side of the valve (4) in the circulation passage (2).

By repeatedly closing the valve, pressurizing the liquid heat medium by the pressurizing device, opening the valve, and transferring the liquid heat medium by the pump, the heat absorption and radiation system can function as a heat pump that transfers heat from the low-temperature portion to the high-temperature portion via the liquid heat medium.

The heat absorption and radiation system (1B) may include a second valve (8) configured to open and close the circulation passage (2) on the downstream side of the pump (3) and on an upstream side of the pressurizing device (5).

By closing the second valve when the pressurizing device pressurizes the liquid heat medium on the upstream side of the valve, it is possible to suppress the inflow of the liquid heat medium pressurized by the pressurizing device into the pump side.

It should be understood that the present disclosure is not limited to the embodiment described above, and various modifications may be made within the scope of the extension of the present disclosure. The embodiment described above is merely one specific form of the disclosure described in the SUMMARY OF THE DISCLOSURE, and does not limit the elements of the disclosure described in the SUMMARY OF THE DISCLOSURE

INDUSTRIAL APPLICABILITY

The present disclosure can be used in manufacturing industry of the heat absorption and radiation system, etc.

The invention claimed is:

1. A heat absorption and radiation system that is configured to use a liquid heat medium obtained by mixing a rubidium-manganese-iron cyano complex into a liquid, the heat absorption and radiation system comprising:
    a circulation passage;
    a pump configured to circulate the liquid heat medium in the circulation passage;
    a valve configured to open and close the circulation passage on an upstream side of the pump;
    a pressurizing device configured to pressurize, on a downstream side of the pump, the liquid heat medium present on an upstream side of the valve in the circulation passage, and
    a processor that is configured to control the circulating passage, the pump, the valve and the pressurizing device in order to:
        release heat from the liquid heat medium by applying a pressure to the liquid heat medium and causing phase transition of the rubidium-manganese-iron cyano complex from a high-temperature phase to a low-temperature phase,
        absorb heat into the liquid heat medium by releasing the pressure applied to the liquid heat medium and causing phase transition of the rubidium-manganese-iron cyano complex from the low-temperature phase to the high-temperature phase, and
        repeat application of the pressure to and release of the pressure from the liquid heat medium.

2. The heat absorption and radiation system according to claim 1, wherein iron of the rubidium-manganese-iron cyano complex is doped with cobalt.

3. The heat absorption and radiation system according to claim 1, wherein manganese of the rubidium-manganese-iron cyano complex is doped with divalent metal ions.

4. The heat absorption and radiation system according to claim 1, wherein the heat absorption and radiation system further includes a second valve configured to open and close the circulation passage on the downstream side of the pump and on an upstream side of the pressurizing device.

* * * * *